United States Patent [19]
Griffith et al.

[11] Patent Number: 5,935,223
[45] Date of Patent: Aug. 10, 1999

[54] SYSTEM FOR BLOCKING ACCESS TO A COMPUTER DEVICE USING A GLUE LOGIC CIRCUIT OPERABLE TO FORCE A TARGET COMPUTER DEVICE TO PERFORM A TARGET ABORT

[75] Inventors: Jenni Griffith; Gary Joseph Verdun, both of Belton, Tex.

[73] Assignee: Texas Instruments Incorporated, Dallas, Tex.

[21] Appl. No.: 08/859,967

[22] Filed: May 21, 1997

[51] Int. Cl.⁶ .................................................. G06F 9/00
[52] U.S. Cl. .................................... 710/38; 710/36
[58] Field of Search ........................ 358/400; 395/306, 395/882, 183.17, 500, 858, 856; 710/38, 36

[56] References Cited

U.S. PATENT DOCUMENTS

| | | | |
|---|---|---|---|
| 5,499,108 | 3/1996 | Cotte et al. ........................... | 358/400 |
| 5,522,050 | 5/1996 | Amini et al. .......................... | 395/306 |
| 5,696,993 | 12/1997 | Gavish ................................. | 395/882 |
| 5,701,409 | 12/1997 | Gates .................................. | 395/183.17 |
| 5,790,831 | 8/1998 | Lin et al. ............................. | 395/500 |

*Primary Examiner*—Thomas C. Lee
*Assistant Examiner*—David Ton
*Attorney, Agent, or Firm*—Ronald O. Neerings; Richard L. Donaldson

[57] ABSTRACT

A system and method that blocks access to a computer device, for example a direct memory access controller device (50), coupled to a PCI bus (30). In a computer system (10) with a PCI bus (30), the present invention couples a glue logic circuit (70) to the PCI bus (30) to block access to the target computer device. The glue logic circuit (70) can also allow access to a requested computer device. In another aspect, the present invention couples a control module (170) to the PCI bus (30) to block access to the target computer device.

25 Claims, 4 Drawing Sheets

SYSTEM FOR BLOCKING ACCESS TO A COMPUTER DEVICE USING A GLUE LOGIC CIRCUIT OPERABLE TO FORCE A TARGET COMPUTER DEVICE TO PERFORM A TARGET ABORT

TECHNICAL FIELD OF THE INVENTION

The present invention relates to a system and method for operating a computer system and, more particularly, to a system and method for blocking access to a computer device coupled to a PCI bus.

BACKGROUND OF THE INVENTION

Computer systems typically include a central processing unit (CPU), devices within the computer (such as memory storage devices), and one or more interfaces with peripheral devices optionally attached to the computer. Computer systems use buses to carry the signals between these various components of the computer system allowing the CPU and the devices to communicate with each other. Recent advancements in the computer industry have resulted in faster buses. One of these faster buses is the Peripheral Component Interconnect (PCI) bus that has developed into an industry standard bus.

The recent development of the PCI bus as an industry standard has created the problem of how to block access to a computer device coupled to the PCI bus. Some access operations over a PCI bus may require blocking access to one or more of the other devices connected to the PCI bus, while allowing a requested device to receive the access. For example, in a computer system with a PCI bus, and two sets of DMA controller devices connected to the PCI bus, an operation might require accessing a first DMA controller on the ISA bus without accessing the second DMA controller (i.e., blocking access to the non-required DMA controller devices coupled to the PCI bus).

Blocking access to a device on a PCI bus presents difficulties due to the nature of how devices interface over a PCI bus. The address phase on a PCI bus appears on the first clock. Therefore, the method of blocking access by blocking an address during a clock other than the first is not viable over a PCI bus. Furthermore, because the first clock on a PCI bus happens relatively quickly, it is difficult to block the address during the first clock in order to block access to the device. A solution to this problem is to slow down the bus by one clock and then block access during the second clock. However, this presents two problems because to do this you must 1) slow down bus (which defeats the purpose of having a faster PCI bus) and 2) use a great deal of hardware to implement this solution. A technique for blocking access to a device without slowing down the PCI bus with minimal hardware support would provide an advantage when using a computer system having a PCI bus.

SUMMARY OF THE INVENTION

In accordance with the present invention an apparatus and method is provided for blocking access to a computer device coupled to a PCI bus.

More specifically, the present invention provides a system and method that blocks access to a computer device coupled to a PCI bus. In a computer system with a PCI bus, the present invention can couple a glue logic circuit to the PCI bus to block access, such as a read or write request to the target computer device. The glue logic circuit can also allow access to a requested computer device.

In one embodiment, the present invention accomplishes this blocking of access by receiving a command/byte enable signal from the initiating device, manipulating the command/byte enable signal from the initiating device such that the manipulated command/byte enable signal for the target device does not match the address signal for the target device, and sending the unmatched command/byte enable signal to the target device to cause the target device to perform a target abort.

In another aspect, the system and method for blocking an access to a target computer device coupled to a PCI bus uses a control module coupled to the PCI bus to control signals from the target and requested devices to prevent the target device from performing the requested access and allow the requested device to perform the requested access.

The present invention provides an important technical advantage by providing the capability to block access to a target computer device coupled to a PCI bus in a computer system.

The present invention provides another technical advantage in that it allows non-target, requested devices to receive the access.

Yet another technical advantage of the present invention is the minimal hardware support required to block the access to the target device.

Still another technical advantage is that the blocking access technique of the present invention provides a performance advantage because it does not slow down PCI operations over the PCI bus. The present invention allows the target device to recognize the access request and still not perform the access.

Another technical advantage of the present invention is that it is capable of blocking access to a target device that occupies the same input/output (I/O) space as the requested device that performs the access.

BRIEF DESCRIPTION OF THE DRAWINGS

For a more complete understanding of the present invention and the advantages thereof, reference is now made to the following description taken in conjunction with the accompanying drawings in which like reference numerals indicate like features and wherein.

DETAILED DESCRIPTION OF THE INVENTION

Preferred embodiments of the present invention are illustrated in the FIGUREs like numerals being used to refer to like and corresponding parts of the various drawings.

Figure 1:
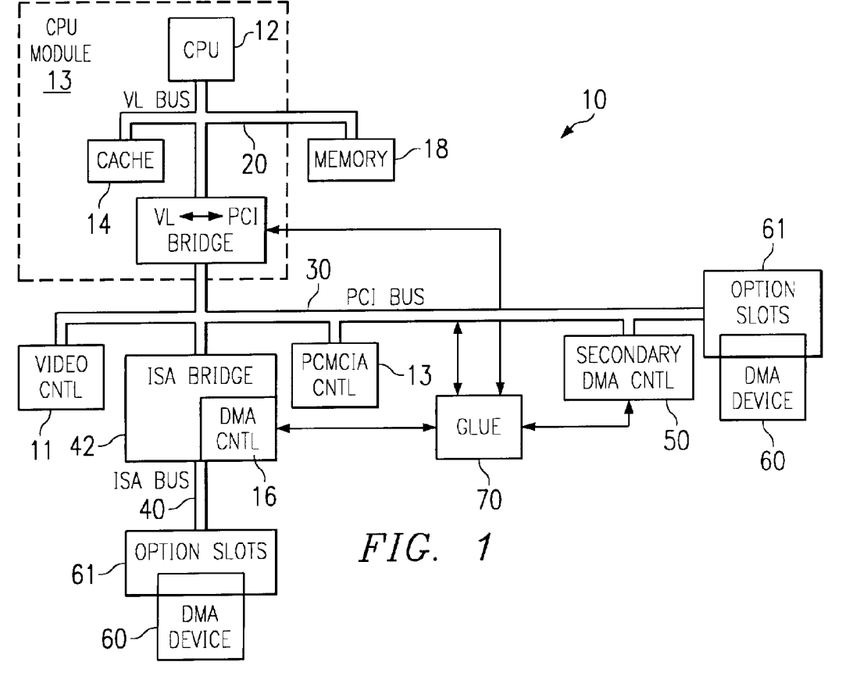
FIG. 1 shows a block diagram of a computer system, having a PCI bus, that includes an embodiment of the present invention.

FIG. 1 shows computer system 10 that includes CPU module 13 coupled to PCI bus 30 created by CPU module 13 at the first end of the PCI bus 30. CPU module 13 includes CPU 12, VL bus 20, CACHE 14, and VL to PCI bridge 22. PCI bus 30 connects CPU 12 to various internal devices including video controller 11 and PCMCIA controller 13. PCI bus 30 further connects CPU 12 to option slots 61 capable of supporting peripheral devices such DMA device 60. The DMA device 60 coupled to PCI bus 30 can include DMA controller capability or, as shown, can include a secondary DMA controller 50. Thus, the DMA controller 50 for the DMA device 60 coupled to PCI bus 30 can be a part of DMA device 60, or a separate device. Glue logic device 70 couples to PCI bus 30 in communication with DMA device 60 and DMA controller 16.

PCI bus 30 can terminate at ISA bridge 42 at the second end of PCI bus 30. ISA bridge 42 serves to convert PCI bus 30 to ISA bus 40. ISA bridge 42 can include DMA controller 16 to control DMA device 60. ISA bus 40 couples to ISA bridge 42 at a first end and can terminate at a second end at option slots 61. Option slots 61 can support internal DMA device 60. The present invention will block access to a device coupled to a PCI bus and allow a device over any bus (including a VL, ISA, or even connected to the same PCI bus) to perform the access.

Computer systems 10 described in FIG. 1 is by way of example only. The devices within the computer could attach to alternative buses and additional computer devices could also connect to the system. For example, the present invention will perform its function regardless of whether the accessed device couples to an ISA bus, a VL bus, the PCI bus or a proprietary bus, so long as the target device to be blocked couples to the PCI bus. For example, if CPU 12 sends a read access request out that should be performed by a device coupled to an ISA bus, one embodiment of the present invention can block the access request to any target devices coupled to a PCI bus that also see the read access request, even if the requesting device and the target devices occupy the same input/output space.

In the embodiment described by FIG. 1, the types of access CPU 12 can send include read and write access requests. For example, CPU 12 can send out a read request asking for the status of the DMA controller 16. When CPU 12 requests status from DMA controllers, the request should go a particular DMA controller. The glue circuitry 70 can direct the read request to the last DMA controller to perform a DMA transaction. In order to accomplish directing the read request to the last DMA controller to perform a DMA transaction, the glue logic circuitry 70 can track which DMA controller last performed a transaction, and when the CPU 12 sends out the read request, the glue logic circuitry 70 can send the read request to whichever set of DMA controllers has last received an acknowledge to do a DMA transaction. When the CPU 12 is attempting to read from the DMA controller, the glue logic circuitry 70 can block the read request from going to any more than one of the DMA controllers in the computer system (other computer devices could be substituted for the DMA controllers of FIG. 4). To illustrate, assume that DMA device 60 connected to ISA bus 40 in FIG. 1 was the last DMA device to make a request. The glue logic circuitry 70 can track this event to understand that DMA device 60 hanging off ISA bus 40 has made the last request. When CPU 12 performs a read cycle to the DMA controller address range, glue logic 70 can block the request from going to DMA controller 50 coupled to PCI bus 30. A similar blocking scheme can occur for a write access request.

Figure 5:
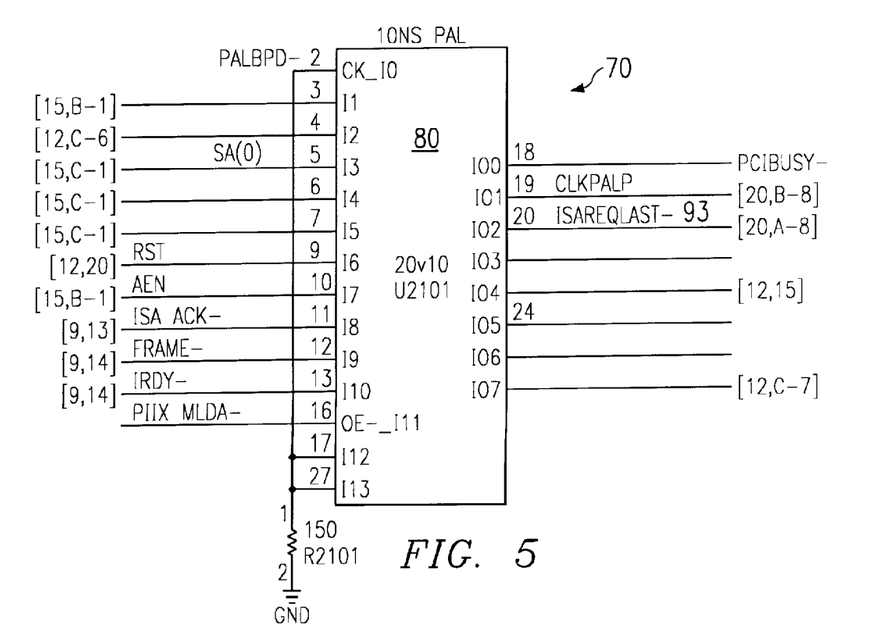
FIG. 5 shows one embodiment of a tracking device to track which computer device last made a request for access.

FIG. 5 illustrates that for one embodiment of tracking the requests from the DMA controllers glue logic circuit 70 can include Programmable Array Logic (PAL) 80. Alternative logic devices could also be used to perform the function of PAL 80. PAL 80 tracks which DMA controller in the system last received a DMA transaction acknowledge by controlling or manipulating input signals through a series of logic equations. PAL 80 then sends this information to another portion of glue logic circuit 70 to send the access request to a particular DMA controller.

A PCI bus has a well-defined set of signals including a "frame" signal that is used to signal a cycle or transfer over the PCI bus. The PCI cycle has an address phase followed by one or more data phases. The first clock occurs in the address phase. The second clock could enter the data phase, but the data phase does not necessarily have to be the second clock. PCI bus 30 has signals used as commands in the address phase and as byte enables in the data phase. PCI bus 30 also has signals that are used as addresses in the address phase and as data in the data phase. PCI bus 30 will typically have 4 to 8 command/byte enable signals and 32 to 64 address/data signals. Because a device hanging off PCI bus 30 performs actions requested on a particular address range, it is difficult to prevent a target device from performing the requested function when the request comes over that address range.

Glue logic circuitry 70 can decode the access for a target device coupled to PCI bus 30, and thereby prevent the device from performing the requested function. The PCI bus specification includes a requirement that a device abort a cycle if the status of both address line 0 (AD0) and address line 1 (AD1), during the address phase, do not match the byte enables (BE) during the data phase. When the target device detects that AD0 and AD1 do not match the BEs, the target device will send out a "stop" signal. Whenever a target device puts out a stop signal without first concluding the cycle, a target abort occurs. Thus, if the signals are unmatched, a target device sends out a signal to abort and the cycle is effectively aborted for that target device.

In addition to forcing the target device to perform a target abort, glue logic device 70 can also prevent the initiator from seeing the cycle was aborted. This prevents the initiator from ending the cycle. Glue logic circuitry 70 does this by blocking the stop signal to the PCI bus controller.

Due to this PCI bus specification requirement, a method of blocking can be utilized to block the an access to target DMA controller 50 coupled to PCI bus 30. In this method, glue logic circuitry 70 forces the target DMA controller 50 to perform a target abort and allows the requested DMA controller 16 to issue a target ready (T-RDY) signal. One way to implement this particular blocking method over a PCI bus involves including PALS and Q buffers within glue logic circuitry 70. The Q buffer operates as a switch to either physically connect or disconnect a signal path.

Figure 2:
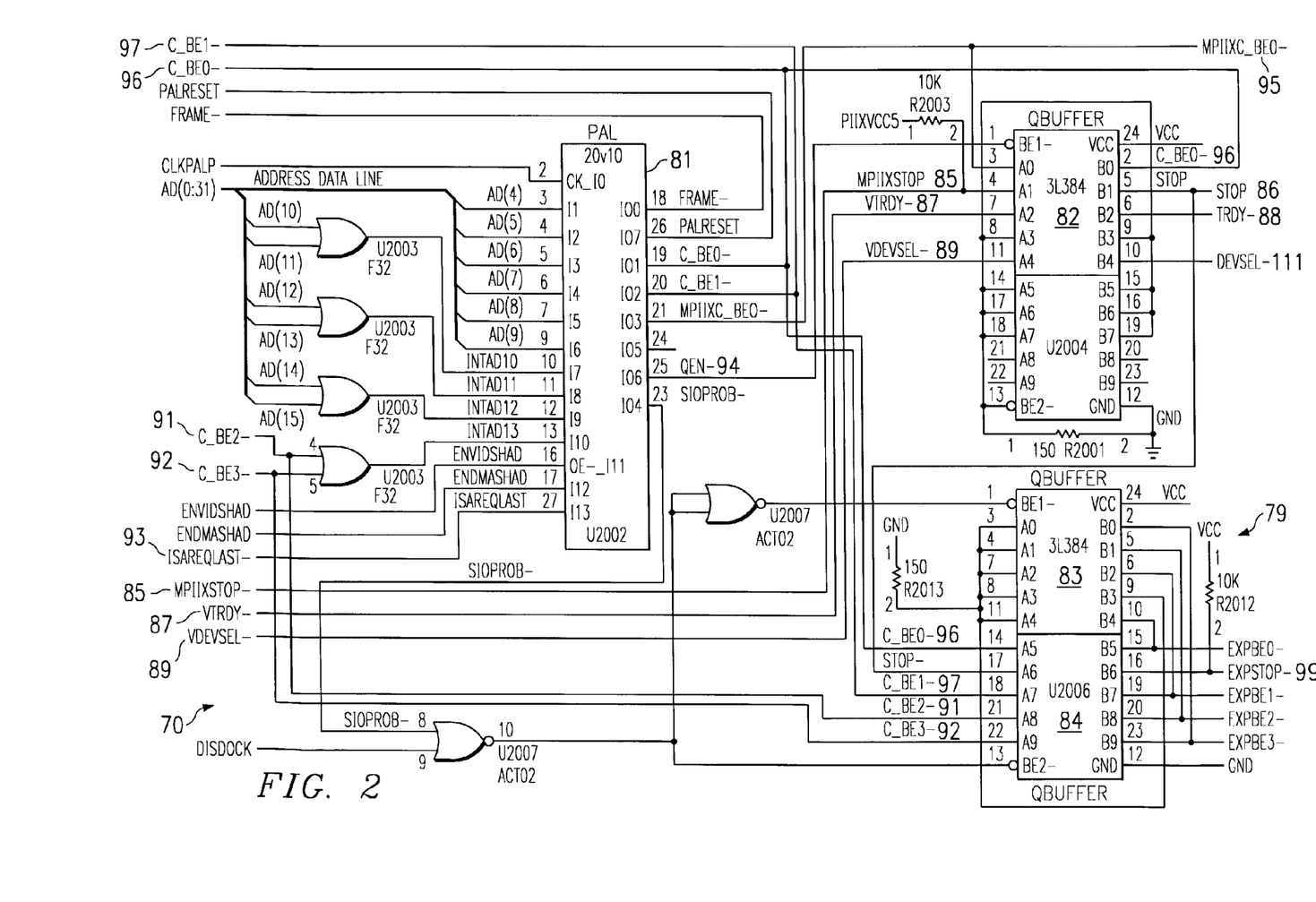
FIG. 2 shows a schematic diagram of a circuit comprising one embodiment of the present invention.
Figure 4:
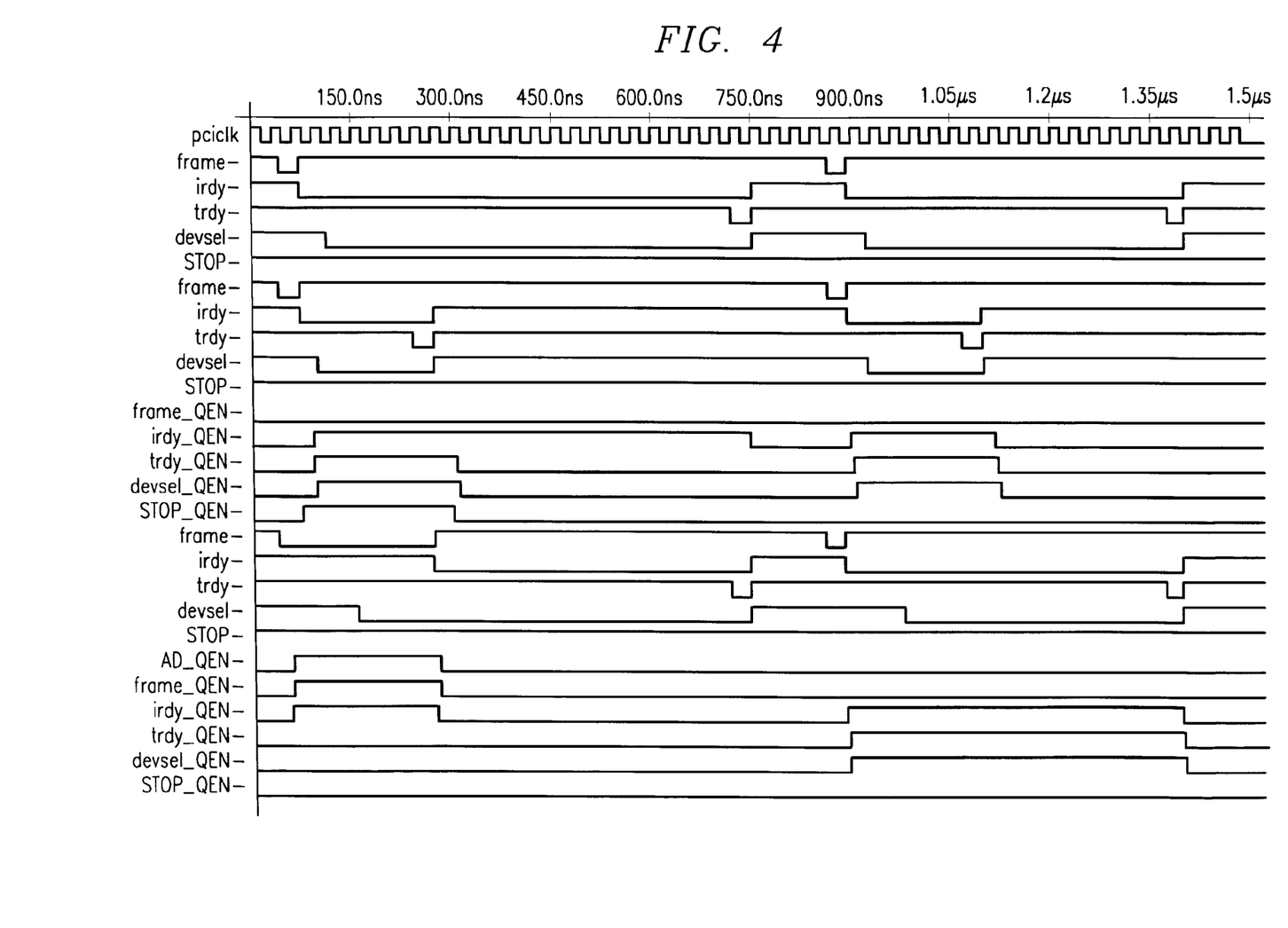
FIG. 4 shows the signal diagrams associated with one blocking function for the embodiment of FIG. 3.

FIG. 2 illustrates glue logic circuitry 70 for blocking access over PCI bus 30. As shown in FIG. 2, glue logic circuit 70 can include PAL 81 that is further connected to Q buffer 82, Q buffer 83, and Q buffer 84. An active low enable signal will close Q buffers to connect signals, while a high enable signal will open Q buffers to disconnect signals. As shown in FIG. 4, when the enable signal for a Q buffer 82 is low, then MPIIX stop signal 85 and STOP signal 86 are physically connected; when the enable signal is high, these signals are disconnected.

FIG. 2 shows two different embodiments for blocking the access requests. The first is described by PAL 81 and Q buffer 82 for blocking a signal from getting to the ISA bridge 42 containing internal DMA controller 16 as shown in FIG. 1. Alternatively, internal DMA controller 16 could exist separately from ISA bridge 42. The second embodiment is described by PAL 81 and Q buffers 83 and 84 for blocking signals from getting to the secondary DMA controllers 50.

In the embodiment described by PAL 81 and Q buffer 82, PAL 81 connects to the address/data lines at PCI bus 30 at points labeled AD(4) through AD (15). Pal 81 also receives Command/byte enable signals C-BE2 91 and C-BE3 92, an ISAREQLAST signal 93 from PAL 80 (shown in FIG. 4) that signals which DMA controller was the last to perform a DMA transaction, and some I/O signals to enable the glue logic process. PAL 81 sends out a QEN signal 94 to enable Q buffer 82. Q buffer 82 provides the switch for ISA bridge 42 containing internal DMA controller 16. Q buffer 82 also receives MPIIXSTOP stop signal 85, VT-RDY target ready signal 87, VDEVSEL device select signal 89, and MPI-IXBE0 command byte enable zero signal 95 from ISA bridge 42.

For blocking a read request access, if PAL 81 sees the read access in the appropriate address range to a requested DMA controller, PAL 81 goes through a series of logic equations to determine what signals to output. If the read request is for a secondary DMA controller 50 coupled to PCI bus 30, PAL 81 will open Q buffer 82, and force the target device, in this case DMA controller 16 coupled to ISA bridge 42, to perform a target abort in order to prevent DMA controller 16 from attempting to supply read data. To accomplish this, PAL 81 can manipulate byte enable signal MPIIXBE0 95 and send the manipulated byte enable signal to the ISA bridge 42 containing the internal DMA controller 16. The manipulation involves sending an unmatched byte enable signal. The ISA bridge containing internal DMA controller 16 sees this manipulated byte enable signal that does not match the address signal. ISA bridge 42 containing the DMA controller 16 then performs a target abort to abort the cycle. To prevent the initiator from seeing the abort cycle, the ISA bridge containing the internal DMA controller's 16 stop signal 85 is isolated from the initiator. The ISA bridge containing the internal DMA controller's stop signal 85 remains isolated by the Q buffer 82 from the internal buses stop signal 86. Because the ISA bridge containing the internal DMA controller's stop signal 85 does not get through, the initiator does not re-initiate the sequence for the internal DMA controller 16. As the last device to make a request, the requested device, in this case the secondary DMA controller 50, performs the transaction. The blocking embodiment described by PALS 81 and 82 complies with the PCI bus specification.

FIG. 2 also describes an embodiment for blocking a read request involving data to be read from a device coupled to an ISA bus such as an internal DMA controller 16 as shown in FIG. 1. The target device, or the device to which access is blocked is secondary DMA controller 50 in this embodiment. Signals go to Q-buffer 79, that comprises Q-buffer 83 (upper portion) and Q buffer 84 (lower portion). Q buffer 83 is connected to secondary DMA controller 50. Q buffer 79 receives command byte enable signals 96, 97, 91, and 92 in addition to stop signal 98 from the initiator for the bus. When a read request comes to the internal DMA controller 16, Q buffer 84 opens and Q buffer 83 closes, forcing an unmatched byte enable signal value out to secondary DMA controller 50. Secondary DMA controller 50 will then perform a target abort. The initiator does not see the abort cycle because the secondary DMA controller's stop signal 99 remains isolated by the Q buffer 84 from the initiator. Thus, secondary DMA controller's stop signal 99 does not get through to the bus stop signal 98. Because the secondary DMA controller's stop signal 99 does not get through, the initiator does not re-initiate the sequence for secondary DMA controller 50. The requested device is the device to which access is not blocked. Since the internal DMA controller 16 is the requested device, the internal DMA controller 16 performs the transaction.

Figure 3:
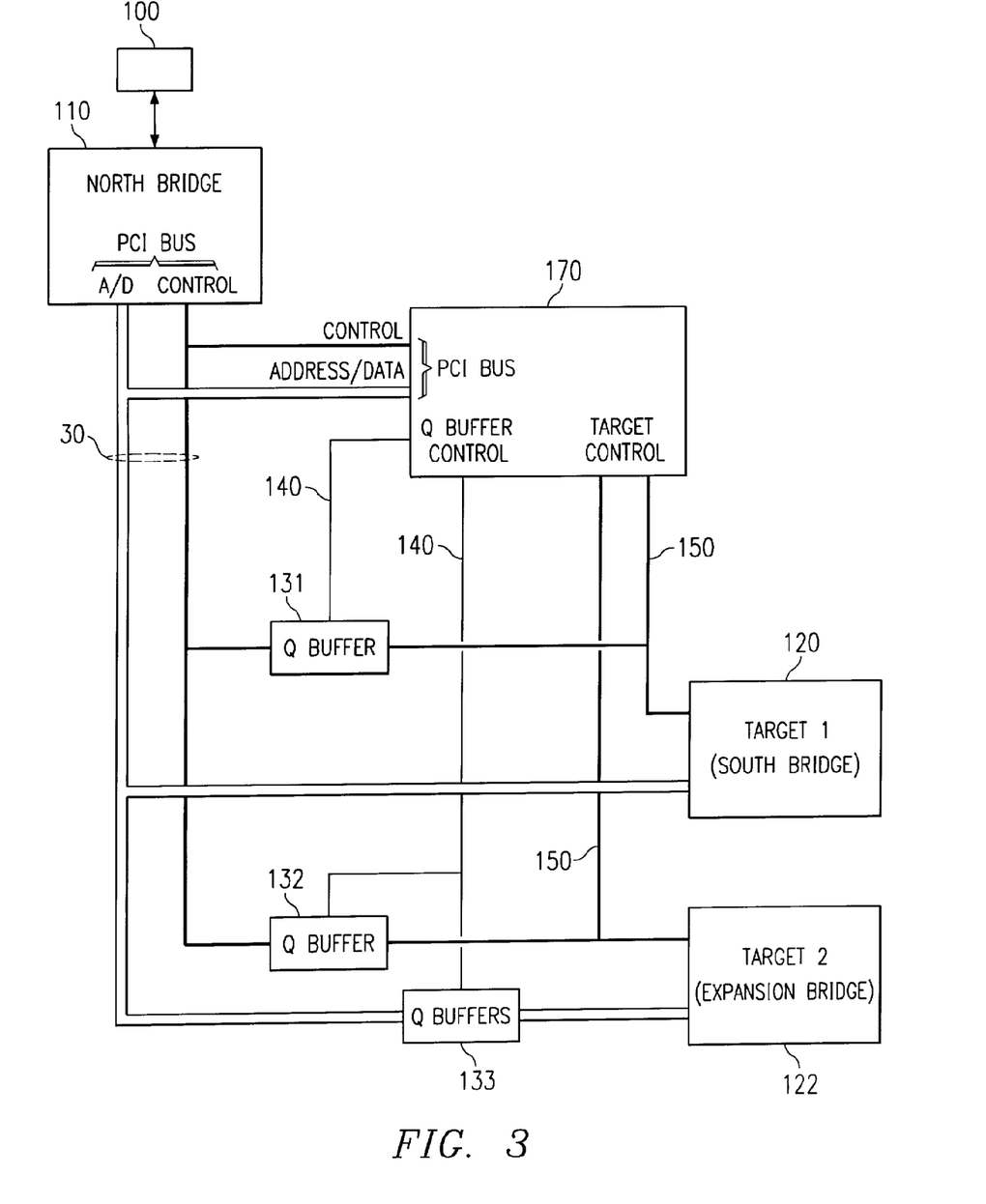
FIG. 3 shows a block diagram associated with another embodiment of the present invention.

FIG. 3 shows a schematic diagram of another embodiment of the present invention. FIG. 4 shows the signal diagram associated with the embodiment of FIG. 3 for blocking access (for example, a read or write access) to a target device. FIG. 3 shows computer system 100 capable of sending and receiving information from North Bridge 110 coupled to PCI bus 30. The industry terminology defines the North Bridge as the bridge receiving an initiating signal, for example a read access request from the CPU within computer system 100. The North Bridge 30 couples via PCI bus 30 to control module 170 and further to Q buffers 131, 132, and 133, and further to first device 120 and second device 122. Control module 170 represents any programmable device for controlling signals and can include, for example, a programmable array logic device. In the embodiment of FIG. 3, first device 120 represents a South Bridge that can include a PCI to ISA bridge, a DMA controller, and any other legacy hardware devices necessary to operate legacy devices on the computer system; second device 122 represents an Expansion Bridge that can include a DMA controller, a PCI to PCI bridge and a PCI to ISA bridge. The system shown in FIG. 3 includes two devices coupled to the PCI bus, requiring that access be blocked to one of the devices. However, the present invention can be used to block access to more than one device if the system included a plurality of devices coupled to the PCI bus.

As shown in FIG. 3, PCI bus 30 carries both the control and the address data (A/D) signals. From North Bridge 110, A/D signals travel over PCI bus 30 to control module 170 and, through Q-buffer 133, to Expansion Bridge 122. From North Bridge 110, control signals travel via PCI bus 30 to control module 170, through Q-buffer 131 to South Bridge 120, and through Q-buffer 132 to Expansion Bridge 122. From control module 170, control signals travel through Q-buffer 131 to South Bridge 120 and through Q-buffer 132 to Expansion Bridge 122. Control module 170 of FIG. 3 also includes Q-buffer control lines 140 over which control module 170 sends control signals to Q-buffers 131, 132, and 133. Control module 170 also includes target control lines 150 over which control module 170 sends target control signals to South Bridge 120 and Expansion Bridge 122. The Q-buffers of FIG. 3 are used to open and close lines to effectively block accesses over the PCI bus. However, the blocking access operation of the present invention can be accomplished without utilizing Q-buffers coupled to each of the address data lines.

In operation, computer system 100 will send an access request to North Bridge 110 for one of the devices coupled via PCI bus 30 to North Bridge 110. The present invention blocks access to the non-requested device (target device) so that the requested device will perform the access by controlling the target device's signals and the requested device's signals. For purposes of illustration, the following will discuss blocking a read access request. Blocking a write access request works similarly.

For the embodiment of FIG. 3 with two devices coupled to PCI bus 30, a read access will be performed by either the South Bridge 120 or the Expansion Bridge 122. To block a read access from being performed by the Expansion Bridge 122, therefore allowing the South Bridge 120 to perform the read, no special manipulation of the signals need be performed. Thus, the control module 170 controls the signals by allowing the signals to process in a normal fashion. No manipulation of the signals is required because, in the embodiment of FIG. 3, the South Bridge 120 is a positive decode agent and the Expansion Bridge 122 is a subtractive decode agent. On a PCI bus, a positive decode agent will claim a cycle by asserting a DEV-select signal within the first three clocks after the address phase if the address phase falls within those claimed by the device. A subtractive decode agent will only assert DEV-select to claim a cycle if no other device has claimed the cycle by the third clock. If no other device claims the cycle within the third clock, the subtractive decode agent claims the cycle on the fourth clock. Thus, Expansion Bridge 122 of FIG. 3 will only claim cycles not claimed by the South Bridge Device 120. As a positive decode agent, the South Bridge device 120 will always claim the cycle unless some manipulation of the signals is performed. Thus, to "block" the read access from being performed by Expansion Bridge 122, the signals are not manipulated and South Bridge 120 will automatically claim the cycle. This will occur for any two or more devices where the requested device is a positive decode agent and the other device is a subtractive decode agent.

In contrast, blocking a read access from being performed by South Bridge 120, therefore allowing Expansion Bridge 122 to perform the read request, requires manipulating the signals as shown in FIG. 4. In FIG. 4, the signals are shown high or low over time. As an example, South Bridge's 120 frame signal begins high at time zero and goes low at approximately 40 nanoseconds (NS). In FIG. 4, PCICLK is the PCI bus clock signal. Each of the North Bridge 110, South Bridge 120, and Expansion Bridge 122 has signals associated with that device listed below that device name in FIG. 4. North Bridge 110 has frame, I-RDY, T-RDY, DEVSEL (DEV-select) and STOP signals. South Bridge 120 has FRAME, I-RDY, T-RDY, DEVSEL and STOP signals to the South Bridge and FRAME_QEN, I-RDY_QEN, T-RDY_QEN, DEVSEL_QEN, and STOP_QEN signals to Q-buffer 131. Expansion bridge 122 has FRAME, I-RDY, T-RDY, DEVSEL, and STOP signals to North Bridge 122, AO_QEN to Q-buffer 133, and FRAME_QEN, I-RDY_QEN, T-RDY_QEN, DEVSEL_QEN, and STOP_QEN to Q-buffer 132.

Because Expansion Bridge 122 is a subtractive decode agent, Expansion Bridge 122 must be prevented from seeing the DEV-select signal from South Bridge 120 signaling that South Bridge 120 has claimed the cycle. In this embodiment, the control module controls various signals from both the target and requested devices. The control module 170 prevents Expansion Bridge's 122 I-RDY signal from going active until South Bridge 120 has completed the cycle. Therefore, Expansion Bridge 122 cannot see the DEV-select signal for South Bridge 120. Control module 170 can also prevents Expansion Bridge 122 from seeing the DEV-select signal by opening Q-buffer 132. Expansion Bridge 122, not seeing another device claiming the cycle, performs the requested access. As far as Expansion Bridge 122 is concerned, no other device has yet claimed the cycle (because Expansion Bridge 122 sees no other device's DEV-select signal active when Expansion Bridge's 122 DEV-select signal goes active).

In operation, to block the read access from being performed by South Bridge 120, control module 170 allows South Bridge 120 to function normally until South Bridge 110 has completed providing the read data and South Bridge's I-RDY signal is removed. This results in a completed cycle with respect to the South Bridge 120. South Bridge 120 will then issue a T-RDY signal. To prevent North Bridge 110 from seeing this completed cycle, control module 170 opens Q-buffer 131 to prevent South Bridge's 120 T-RDY from going to North Bridge 110. Control module 170 sends Expansion Bridge 122 a longer frame signal and keeps Expansion Bridge's 122 I-RDY signal inactive until South Bridge 120 has finished providing the read data and its I-RDY signal has been removed. Alternatively, control module 170 can disconnect Expansion Bridge's 122 I-RDY from North Bridge 110 during the address phase and hold the signal high until South Bridge 120 has completed its cycle. When South Bridge 120 has sent its T-RDY signal, control nmodule 170 can assert the I-RDY signal to the Expansion Bridge 122, thereby signaling Expansion Bridge 122 to transfer data according to the read access request. Expansion Bridge 122 then completes the cycle and supplies the requested read data and asserts T-RDY.

To prevent contention between South Bridge 120 and Expansion Bridge 122 on the PCI bus 30 from the start of the cycle until South Bridge 120 issues its T-RDY signal, Expansion Bridge's 122 I-RDY can be held high until South Bridge's 120 T-RDY issues and the Q-buffers 133 coupled to South Bridge 120 are opened to prevent communication between the two devices during this initial time period.

Although the present invention has been described in detail, it should be understood that various changes, substitutions and alterations can be made hereto without departing from the spirit and scope of the invention as described by the appended claims.

What is claimed is:

1. A system for use in a computer to block an access request operation to a target computer device coupled to a PCI bus, said PCI bus also coupled to an initiator, comprising:

(a) said target computer device;

(b) a PCI bus coupled to said target computer device;

(c) an initiator coupled to said PCI bus; and (d) a glue logic circuit operable to force said target computer device to perform a target abort, said glue logic circuit comprising a logic device operable to receive command/byte enable signals for said target computer device, manipulate said command/byte enable signals for the target computer device such that the manipulated command/byte enable signals for the target computer device do not match the address signal for the target computer device, and send the unmatched command/byte enable signals to the target computer device, to cause the target computer device to perform a target computer device abort;

(e) a switch device in the circuit path between said initiator and said target device computer; and (f) a requested computer device operable receive the access, the requested computer device occupying the same input/output space as the target device, said glue logic circuit determining which device is the requested device by manipulating equations within said glue logic device; said target device, upon receipt of said unmatched signal, emitting a stop signal to said initiator to conclude the access operation to provide a target computer device abort said glue logic circuit opening said switch to prevent the stop signal from said target computer device from being received by said initiator to prevent said initiator from detecting the abort cycle and preventing said initiator from ending said access operation, said glue logic circuit sending a matched command/byte enable signal to said requested device to allow said requested device to perform said access operation.

2. The system of claim 1 wherein the target computer device, upon receipt of said unmatched signal, said target computer device sending a stop signal to said initiator to conclude the access request operation to provide a target computer device abort.

3. The system of claim 1 further comprising a switch device disposed in the path between said target computer device and said initiator, said target computer device, upon receipt of said unmatched signal, emitting a stop signal to said initiator to conclude the access operation to provide a target computer device abort, said glue logic circuit opening said switch to prevent the stop signal from the target computer device from being received by the initiator to thereby prevent the initiator from detecting the abort cycle to prevent the initiator from re-initiating the access request sequence to the target computer device.

4. The system of claim 1 further comprising:
a switch device in the circuit path between said initiator and said target device computer; and
a requested computer device operable to receive said access request operation;
said target computer device, upon receipt of said unmatched signal, emitting a stop signal to said initiator to conclude said access request operation to provide a target computer device abort, said glue logic circuit opening said switch in a path to said initiator to prevent the stop signal from the target computer device from being received by the initiator to prevent the initiator from detecting the abort cycle and preventing the initiator from ending the access request operation.

5. The system of claim 1 further comprising:
a switch device in the circuit path between said initiator and said target device computer; and
a requested computer device operable to receive the access operation;
said target computer device, upon receipt of the unmatched signal, emitting a stop signal to the initiator to conclude the access operation to provide a target computer device abort, said glue logic circuit opening said switch to prevent the stop signal from said target computer device from being received by said initiator to prevent said initiator from detecting said abort to prevent said initiator from ending said access request operation, said glue logic circuit sending a matched command/byte enable signal to said requested device to allow the requested device to perform the access operation.

6. The system of claim 1 further comprising:
a switch device in the circuit path between said initiator and said target device computer;
a requested computer device operable to receive said access; and
a plurality of computer devices operable to receive said access, said plurality of computer devices occupying the same input/output space as said requested device;
said target computer device, upon receipt of said unmatched signal, emitting a stop signal to said initiator to conclude the access operation and to provide a target abort, said glue logic circuit opening said switch to prevent the stop signal from said target computer device from being received by said initiator to prevent said initiator from detecting said target abort to prevent said initiator from ending the access operation.

7. The system of claim 1 further comprising:
a switch device in the circuit path between said initiator and said target device computer; and
a requested computer device operable to receive the access; and a controller device coupled to said requested device;
said target computer device, upon receipt of said unmatched signal, emitting a stop signal to said initiator to conclude said access operation to provide a target computer device abort, said glue logic circuit opening said switch to prevent the stop signal from said target computer device from being received by said initiator to prevent said initiator from detecting the abort operation to prevent said initiator from ending said access operation said glue logic circuit further sending said matched command/byte enable signal to said controller for said requested device to allow said requested device to perform said access operation.

8. The system of claim 1 wherein said access operation comprises read and write requests.

9. The system of claim 1 wherein said glue logic device comprises a programmable array logic device.

10. The system of claim 1 further comprising:
a switch device in the circuit path between said initiator and said target device computer;
said target computer device comprising a direct memory access device controller operable to receive said access operation; and
a requested computer device comprising a direct memory access device controller operable to receive said access operation;
said target direct memory access device controller, upon receipt of said unmatched signal, emitting a stop signal to said initiator to conclude said access operation resulting in a target abort, said glue logic circuit opening said switch to prevent the stop signal from said target computer device direct memory access device controller from being received by said initiator to prevent said initiator from detecting said abort to prevent said initiator from ending said access operation, said glue logic circuit sending said matched command/byte enable signal to the controller for the requested direct memory access device controller to allow the requested direct memory access device controller to perform the access operation.

11. The system of claim 1 wherein said PCI bus comprises a plurality of PCI bus elements.

12. A method for use in a computer system of blocking an access to a target computer device coupled to a PCI bus comprising the steps of:
(a) providing a PCI bus and a glue logic circuit and coupling said glue logic circuit to said PCI bus; and
(b) forcing said target computer device to perform a target abort by sending a command/byte enable signal from said glue logic circuit to said target computer device that does not match the status of address line 0 and address line 1 during the address phase on the PCI bus;
wherein the step of forcing the target device to perform a target abort further comprises the steps of;
receiving command/byte enable signals from the target device at the glue logic circuit; and
manipulating the received command/byte enable signals with the glue logic circuit so that the manipulated command/byte enable signal does not match the status of address line 0 and address line 1 during the address phase for the target device;
receiving the unmatched signal at the target device;
sending out a stop signal from the target device to the initiator prior to conclusion of the access cycle;
coupling a requested device to the computer system that occupies the same input/output space as the target device;

coupling a switch to the glue logic circuit that connects the target device to the initiator;

opening a switch in the path along which the stop signal flows between the target device and the initiator to prevent the stop signal from the target device from being received by the initiator to prevent the initiator from detecting the abort cycle to prevent the initiator from ending the access sequence to the target device, and wherein preventing the system initiator detecting the abort cycle further comprises the steps of;

receiving a signal from the glue logic circuit at the switch device;

opening a switch in the path to the target computer device to isolate the target computer device's stop signal from the system initiator;

preventing the system initiator from detecting the abort cycle;

preventing the system initiator from ending the read request sequence to the non-requested computer device; and preventing the target computer device from performing requested access.

13. The method of claim 12 wherein forcing the target device to perform a target abort further comprises the steps of:

receiving command/byte enable signals from the target computer device at the glue logic circuit; and manipulating the received command/byte enable signals with the glue logic circuit so that the manipulated command/byte enable signal does not match the status of address line 0 and address line 1 during the address phase for the target device.

14. The method of claim 12 wherein forcing the target device to perform a target abort further comprises the steps of:

receiving command/byte enable signals from the target device at the glue logic circuit; and manipulating the received command/byte enable signals with the glue logic circuit so that the manipulated command/byte enable signal does not match the status of address line 0 and address line 1 during the address phase for the target device;

receiving the unmatched signal at the target device; and sending out a stop signal from the target device to the initiator prior to conclusion of the access cycle.

15. The method of claim 12 wherein forcing the target device to perform a target abort further comprises the steps of:

receiving command/byte enable signals from the target device at the glue logic circuit; and manipulating the received command/byte enable signals with the glue logic circuit so that the manipulated command/byte enable signal does not match the status of address line 0 and address line 1 during the address phase for the target device;

receiving the unmatched signal at the target device;

sending out a stop signal from the target device to the initiator prior to conclusion of the access cycle;

coupling a switch to the glue logic circuit that connects the target device to said initiator; and opening a switch in the path along which the stop signal flows between the target device and the initiator to prevent the stop signal from the target device from being received by the initiator to prevent the initiator from detecting the abort cycle to prevent the initiator from ending the access sequence to the target device.

16. The method of claim 12 wherein forcing the target device to perform a target abort further comprises the steps of:

receiving command/byte enable signals from the target device at the glue logic circuit; and manipulating the received command/byte enable signals with the glue logic circuit so that the manipulated command/byte enable signal does not match the status of address line 0 and address line 1 during the address phase for the target device;

receiving the unmatched signal at the target device;

sending out a stop signal from the target device to the Initiator prior to conclusion of the access cycle;

coupling a switch to the glue logic circuit that connects the target device to the initiator;

opening a switch in the path along which the stop signal flows between the target device and the initiator to prevent the stop signal from the target device from being received by the initiator to prevent the initiator from detecting the abort cycle to prevent the initiator from ending the access sequence to the target device; and coupling a requested device to the computer system that occupies the same input/output space as the target device.

17. The method of claim 12 wherein forcing the target computer device to perform a target abort further comprises the steps of:

receiving command/byte enable signals from the target computer device at the glue logic circuit; and manipulating the received command/byte enable signals with the glue logic circuit so that the manipulated command/byte enable signal does not match the status of address line 0 and address line 1 during the address phase for the target device;

receiving the unmatched signal at the target device;

sending out a stop signal from the target device to the initiator prior to conclusion of the access cycle;

coupling a requested device to the computer system that occupies the same input/output space as the target computer device;

sending matched command/byte enable signals from the glue logic device to the requested device;

allowing the requested device to perform the requested access;

coupling a switch to the glue logic circuit that connects the target device to the initiator; and opening a switch in the path along which the stop signal flows between the target computer device and the initiator to prevent the stop signal from the target computer device from being received by the initiator to prevent the initiator from detecting the abort cycle to prevent the initiator from ending the access sequence to the target device;

and wherein preventing the initiator from detecting the abort cycle further comprises the steps of;

receiving a signal from the glue logic circuit at the switch device;

opening a path in the switch to the target to isolate the target device's stop signal from the system initiator;

preventing the system initiator from detecting the abort cycle;

preventing the system initiator from ending the read request sequence to the non-requested computer device; and preventing the target computer device from performing requested access.

18. The method of claim 13 wherein blocking access to a target device further comprises the steps of:

coupling a target device that is a direct memory access (DMA) controller;

receiving commandibyte enable signals from the target DMA controller device at the glue logic circuit; and manipulating the received command/byte enable signals with the glue logic circuit so that the manipulated command/byte enable signal does not match the status of address line 0 and address line 1 during the address phase for the target DMA controller device;

receiving the unmatched signal at the target DMA controller device;

sending out a stop signal from the target DMA controller device to the initiator prior to conclusion of the access cycle;

coupling a requested DMA controller device to the computer system that occupies the same input/output space as the target device, said glue logic circuit determining which computer device within the system is the requested device;

sending matched command/byte enable signals from the glue logic device to the requested DMA controller device;

allowing the requested DMA controller device to perform the requested access;

coupling a switch to the glue logic circuit that connects the target computer device to the initiator; and opening a switch in the path along which the stop signal flows between the target DMA controller device and the initiator to prevent the stop signal from the target DMA controller device from being received by the initiator to prevent the initiator from detecting the abort cycle to prevent the initiator from ending the access sequence to the target DMA controller device;

and wherein preventing the initiator from detecting the abort cycle further comprises the steps of;

receiving a signal from the glue logic circuit at the switch device;

opening the switch to the target to isolate the target computer device's stop signal from the system initiator;

preventing the system initiator from detecting the abort cycle;

preventing the system initiator from ending the read request sequence to the non-requested computer device; and preventing the target computer device from performing requested access.

19. A system for use in a computer to block an access to a target computer device coupled to a PCI bus, comprising:

said PCI bus coupled to said target computer device;

an initiating device operable to send the access;

a requested device operable to perform the requested access, the requested device further operable to receive signals;

said target device coupled to the PCI bus;

a control module coupled to the PCI bus, the control module in communication with the initiating device, the requested device and the target device, the control module operable to control signals from the target computer device and requested devices to prevent the target computer device from performing the requested access and allow the requested device to perform the requested access;

a first Q-buffer coupled to the target device;

a second Q-buffer coupled to the requested device; and wherein the target device is a positive decode agent, and both the requested device and the target device further having I-RDY T-RDY, and DEV-select signals, and further wherein the control module manipulates the target device signals to prevent the initiating device from seeing the target device's T-RDY signal by opening the Q-buffer coupled to the target device, and the control module manipulates the requested device's I-RDY signal by disconnecting the requested device's I-RDY from the initiating device by opening the Q-buffer coupled to the requested device until the target device has issued a T-RDY signal, the control module then activates the requested device's I-RDY signal to allow the requested device to perform the requested access.

20. The system of claim 19 wherein the target device is a subtractive decode agent, and further wherein the control module does not manipulate the signals sent to the target and requested devices to allow the positive decode agent requested device to perform the requested access.

21. The system of claim 19 wherein the target device is a positive decode agent, and further wherein the control module manipulates the signals sent to the target device, and manipulates the signals sent to the requested device to allow the requested device to perform the requested access.

22. The system of claim 19 wherein the target device is a positive decode agent, and both the requested device and the target device further having I-RDY, T-RDY, and DEV-select signals, and further wherein the control module manipulates the target device signals to prevent the initiating device from seeing the target device's T-RDY signal and the control module manipulates the requested device's I-RDY signal to remain inactive until the target device has issued a T-RDY signal, the control module then activates the requested device's I-RDY signal to allow the requested device to perform the requested access.

23. A method for use in a computer system of blocking an access from an initiating device to a target computer device coupled to a PCI bus to allow a requested device to perform the access, comprising the steps of:

providing said target computer device;

providing said PCI bus coupled to said computer device;

coupling a control module to said PCI bis; and using the control module to control the signals from the target computer device and signals from the requested device to prevent the target computer device from performing the requested access and allow the requested device to perform the requested access;

coupling a first Q-buffer coupled to the target computer device;

coupling a second Q-buffer coupled to the requested device;

using a positive decode agent as the target computer device;

opening the Q-buffer coupled to the target device to prevent the prevent the initiating device from seeing the target computer device's T-RDY signal;

opening the Q-buffer coupled to the requested device to disconnect the requested device's I-RDY from the initiating device, until the target computer device has issued a T-RDY signal; and activating the requested device's I-RDY signal upon issuance of a T-RDY signal by the target computer device to allow the requested device to perform the requested access.

24. The method of claim 23, further comprising the steps of:

using a positive decode agent as the requested device;

using a subtractive decode agent as the target computer device;

allowing the signals from the target computer device and the signals from the requested device to operate without manipulation to allow the positive decode agent requested device to perform the requested access.

25. The method of claim 23, further comprising the steps of:

using a positive decode agent as the target computer device; and controlling the target device's T-RDY signal to prevent the initiating device from seeing the target computer device's T-RDY signal; and controlling requested device's I-RDY signal by holding the signal inactive until the target computer device has issued a T-RDY signal;

activating the requested device's I-RDY signal after the target computer device has issued a T-RDY signal to allow the requested device to perform the requested access.

* * * * *

UNITED STATES PATENT AND TRADEMARK OFFICE
CERTIFICATE OF CORRECTION

PATENT NO. : 5,935,223
DATED : August 10, 1999
INVENTOR(S) : Griffith et al

It is certified that error appears in the above-identified patent and that said Letters Patent is hereby corrected as shown below:

Title page, insert the following:
-- [60] Provisional application No. 60/018,072, May 21, 1996. --

Column 1, line 6, insert the following:
-- CROSS REFERENCE TO RELATED APPLICATION
Reference is made to and priority claimed from U.S. Provisional Appliction Serial No. 60/018,072, filed May 21, 1996, entitled System For Blocking Access To A Computer Device Using A Glue Logic Circuit Operable To Force A Target Computer Device To Perform A Target Abort. --

Signed and Sealed this

Fourth Day of January, 2000

Attest:

Attesting Officer

*Acting Commissioner of Patents and Trademarks*